US011724200B2

(12) United States Patent
Packin et al.

(10) Patent No.: US 11,724,200 B2
(45) Date of Patent: *Aug. 15, 2023

(54) MARKET-BASED GAMING PLATFORM

(71) Applicants: Assaf Packin, Brooklyn, NY (US); Robin Shapiro, New York, NY (US)

(72) Inventors: Assaf Packin, Brooklyn, NY (US); Robin Shapiro, New York, NY (US)

( * ) Notice: Subject to any disclaimer, the term of this patent is extended or adjusted under 35 U.S.C. 154(b) by 290 days.

This patent is subject to a terminal disclaimer.

(21) Appl. No.: 16/936,426

(22) Filed: Jul. 23, 2020

(65) Prior Publication Data

US 2020/0376387 A1 Dec. 3, 2020

Related U.S. Application Data

(63) Continuation of application No. 16/050,925, filed on Jul. 31, 2018, now Pat. No. 10,751,628.

(51) Int. Cl.

| | |
|---|---|
| ***A63F 13/792*** | (2014.01) |
| ***A63F 13/65*** | (2014.01) |
| ***A63F 13/80*** | (2014.01) |
| ***H04L 9/06*** | (2006.01) |
| ***H04L 9/00*** | (2022.01) |

(52) U.S. Cl.

CPC ............ *A63F 13/792* (2014.09); *A63F 13/65* (2014.09); *A63F 13/80* (2014.09); *H04L 9/0637* (2013.01); *H04L 9/0643* (2013.01); *A63F 2300/55* (2013.01); *H04L 9/50* (2022.05)

(58) Field of Classification Search

CPC ...... A63F 13/792; A63F 13/80; H04L 9/0637; H04L 9/0643

See application file for complete search history.

(56) References Cited

U.S. PATENT DOCUMENTS

2019/0130701 A1* 5/2019 Simons ............... G07F 17/3251
2019/0333030 A1* 10/2019 Ramasamy ...... G06Q 20/38215

* cited by examiner

*Primary Examiner* — William H McCulloch, Jr.
*Assistant Examiner* — Ankit B Doshi

(57) ABSTRACT

A method is disclosed for provisioning a market-based game on a blockchain platform comprising: allocating, on the blockchain platform, a plurality of non-fungible tokens, each non-fungible token representing a different real-life entity in a pool of real-life entities; for each of the plurality of non-fungible tokens, allocating, on the blockchain platform, one or more corresponding fungible tokens that represent shares in the non-fungible token; allocating, on the blockchain platform, pool-management logic; allocating, on the blockchain platform, entity-management logic; and replenishing the pool-specific award by transferring the pool-specific award to a wallet that is associated with the pool of real-life entities for further distribution by the pool-management logic and the entity-management logic.

20 Claims, 9 Drawing Sheets

MARKET-BASED GAMING PLATFORM

CROSS REFERENCE TO RELATED APPLICATIONS

This application is a continuation of, and claims priority from, application Ser. No. 16/050,925, which was filed on Jul. 31, 2018, the entire contents of which are hereby incorporated herein by reference.

BACKGROUND

Technical Field

The present disclosure relates generally to electronic devices, and more particularly to a market based gaming platform.

Description of the Related Art

Blockchain technology is a relatively new technology that has been used in digital currency implementations. Blockchain utilizes a data structure that stores a list of transactions and can be thought of as a distributed electronic ledger that records transactions between source identifier(s) and destination identifier(s). The transactions are bundled into blocks and every block (except for the first block) refers back to or is linked to a prior block in the chain. Computer nodes maintain the blockchain and cryptographically validate each new block and thus the transactions contained in the corresponding block. Importantly, the validation process provides a consensus mechanism, which allows for the trustless exchange of value over communications networks, such as the Internet.

It should be understood that nothing in the background section shall be construed as an admission of prior art unless otherwise noted.

SUMMARY

According to aspects of the disclosure, a method is disclosed for provisioning a market-based game on a blockchain platform comprising: allocating, on the blockchain platform, pool-management logic including one or more processor-executable instructions, which when executed by at least one node in the blockchain platform cause the node to: allocate, on the blockchain platform, a plurality of non-fungible tokens, each non-fungible token representing a different real-life entity in a pool of real-life entities, for each of the plurality of non-fungible tokens, allocate, on the blockchain platform, one or more corresponding fungible tokens that represent shares in the non-fungible token, and calculate a first entity-specific prize corresponding to a first real-life entity in the pool of real-life entities based on a rank of the first real-life entity in the pool of real-life entity, and a pool-specific prize associated with the pool of real-life entities, the first real-life entity being represented by a first one of the plurality of non-fungible tokens; allocating, on the blockchain platform, entity-management logic including one or more processor-executable instructions, which when executed by at least one node in the blockchain platform cause the node to: calculate a first user-specific prize based on the first entity-specific prize and an amount of shares in the first non-fungible token that is stored in a first user wallet, and execute a transaction on the blockchain platform providing the first user-specific prize to an owner of the first user wallet; and replenishing the pool-specific prize by transferring electronic funds to a pool wallet that is associated with the pool of real-life entities for further distribution by the pool-management logic and the entity-management logic.

According to aspects of the disclosure, an apparatus is disclosed for provisioning a market-based game on a blockchain platform comprising at least one processor; and a memory operatively coupled to the at least one processor and being configured to store processor-executable instructions, which when executed by the at least one processor cause the at least one processor to perform a method comprising the steps of: allocating, on the blockchain platform, pool-management logic including one or more processor-executable instructions, which when executed by at least one node in the blockchain platform cause the node to: allocate, on the blockchain platform, a plurality of non-fungible tokens, each non-fungible token representing a different real-life entity in a pool of real-life entities, for each of the plurality of non-fungible tokens, allocate, on the blockchain platform, one or more corresponding fungible tokens that represent shares in the non-fungible token, and calculate a first entity-specific prize corresponding to a first real-life entity in the pool of real-life entities based on a rank of the first real-life entity in the pool of real-life entity, and a pool-specific prize associated with the pool of real-life entities, the first real-life entity being represented by a first one of the plurality of non-fungible tokens; allocating, on the blockchain platform, entity-management logic including one or more processor-executable instructions, which when executed by at least one node in the blockchain platform cause the node to: calculate a first user-specific prize based on the first entity-specific prize and an amount of shares in the first non-fungible token that is stored in a first user wallet, and execute a transaction on the blockchain platform providing the first user-specific prize to an owner of the first user wallet; and replenishing the pool-specific prize by transferring electronic funds to a pool wallet that is associated with the pool of real-life entities for further distribution by the pool-management logic and the entity-management logic.

These and other aspects of the present disclosure are described in greater detail hereinbelow with reference to the accompanying figures.

DETAILED DESCRIPTION

Figure 1:
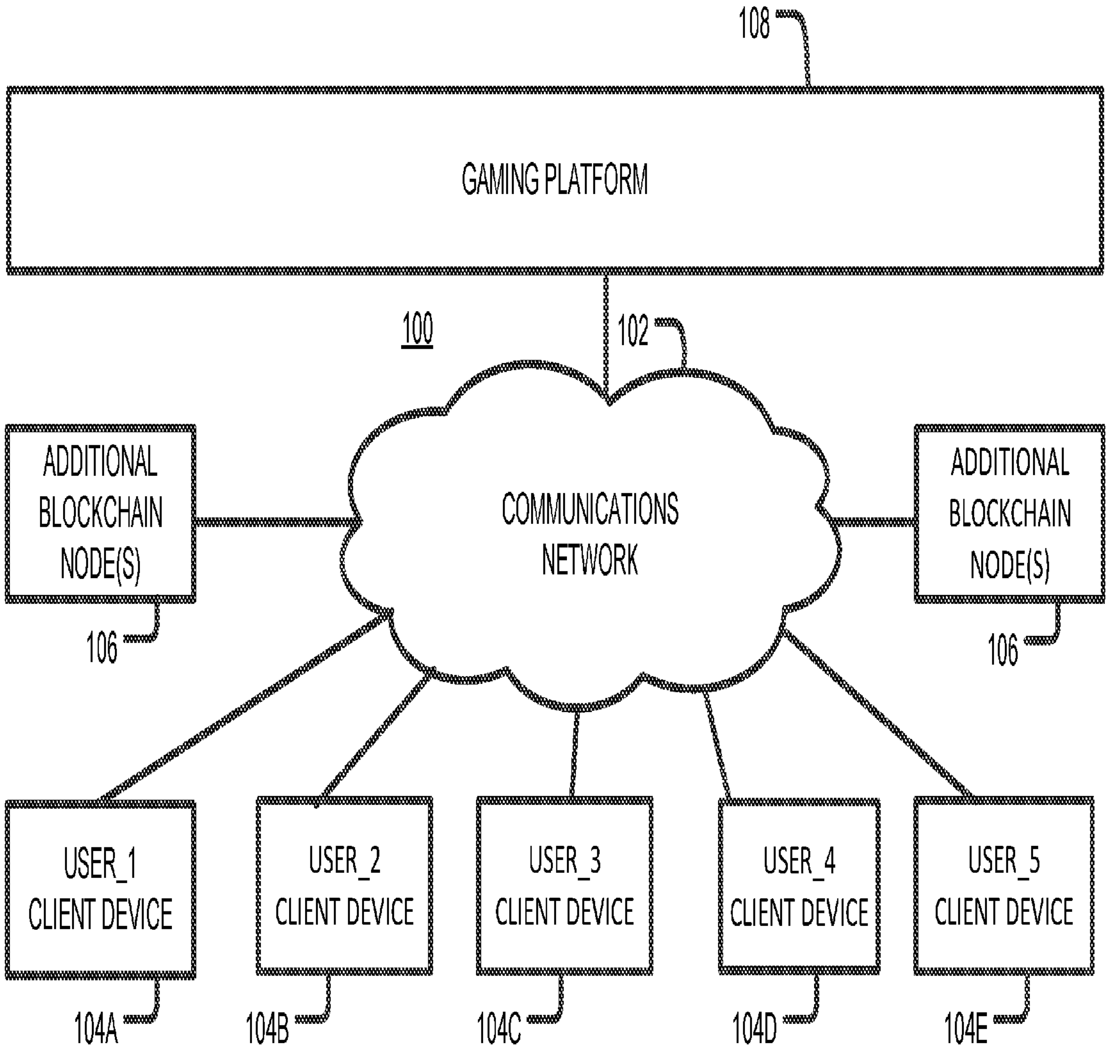
FIG. 1 is a diagram of an example of a system, according to aspects of the disclosure.

According to aspects of the disclosure, a gaming platform is disclosed which is a trustless, decentralized system that enables users to create markets in which users can build a portfolio and earn bonuses based on the performance of the assets in the portfolio and/or the performance of the portfolio as a whole. As opposed to prediction markets or gambling books, the markets created by the gaming platform reward users based on a system of algorithmically designed payouts tied to real-world events. The markets can be deployed on a blockchain platform, and they may operate in a decentralized manner to allow users to interact with one another directly. Payouts across the markets may also be decentralized and subject to community consensus through a system of reporting and attestation of real-life outcome of events by the users who participate in the markets. It should be understood that the embodiments that are described herein are merely illustrative implementations and are not intended to limit the disclosure those particular embodiments.

One example of a market that can be created by the gaming platform is based on the interaction of fantasy sports and the corresponding real-world performance of athletes. More particularly, the market may define a pool of athletes. It should be understood that the term "athlete" may more generally refer to a player in any competitive endeavor. Such competitive endeavors are not limited to a sporting competition that includes athletes and may also include, for example, other games (e.g., chess or the like) or political elections. Further, shares may be additionally or alternatively provided for groups, teams, and/or leagues of players. Such groups, teams, and/or leagues of players may be based on real-world groupings (e.g., a professional baseball team) or may be user-defined (e.g., users may create fantasy groupings of players who may not be members of the same team in the real-world).

Further, each athlete may be assigned a number of shares and each share may have a corresponding value. Additionally or alternatively, events (e.g., a sporting team winning a competition) may be assigned a number of shares and each share may have a value. The gaming platform may facilitate the purchase and/or trading of the shares that correspond to the athletes and/or events. The market demand for the shares may determine the value of the shares. Additionally or alternatively, the fulfillment of certain events (e.g., a sporting team winning a competition) may determine the value of the shares. Moreover, the value of shares may be linked to time and at the expiration of time, the value of the shares may expire worthless, for example, upon the non-fulfillment of an event or may be assigned a maximum or full value, for example, upon the fulfillment of the event. Additionally or alternatively, the value of the shares may be market driven (i.e., the value is based on what others are willing to pay).

As described above, the gaming platform allows users to purchase shares of the players (e.g., athletes and/or events) in the pool. Over time, the users are rewarded based on the real-life performance of the players they own shares in. In some aspects, the market allows users to interact with their favorite athletes and participate in their favorite esports events. Moreover, the market allows users to buy and sell these virtual shares of professional athletes and build them into a portfolio of their ideal roster. In this respect, the market replicates the trading activity of a traditional stock market while allowing users to experience the thrills of real-time performance associated with fantasy esports.

As already discussed in some detail, although the examples provided throughout the disclosure concern markets related to the real-world performance of athletes, it will be understood that markets can be developed for any real-world industry in which there are clearly defined trackable events such as politics, stock traders, pundits and many more. In this regard, it will be understood that the concepts and ideas expressed throughout the disclosure can be applied to any suitable context in which the respective performances of entities can be measured against one another to determine the entities' relative performance.

FIG. 1 is a diagram of an example of a system 100, according to aspects of the disclosure. The system 100 includes a plurality of client devices 104, a plurality of computing devices 106, and a gaming platform 108 that are operatively coupled to one another via a communications network 102. The communication network 102 may include a local area network (LAN), a wide area network (WAN), the Internet, and/or any other suitable type of network. Any of the client devices 104 may include any suitable type of a computing device, such as a smartphone, a laptop computer, a desktop computer, a game console, a tablet, and/or any other suitable type of computing device. Any of the computing devices may be a desktop computer, a smartphone, a laptop computer, a server, a distributed computing system, and/or any other suitable type of computing device. The gaming platform 108 may include a server, a desktop computer, a laptop computer, and/or any other suitable type of computing device. Although in the present example, the gaming platform 108 is depicted as a monolithic block, it will be understood that in some implementations the gaming platform 108 may include a plurality of computing devices that are coupled to one another via the communications network 102 and/or one or more other networks.

Figure 2:
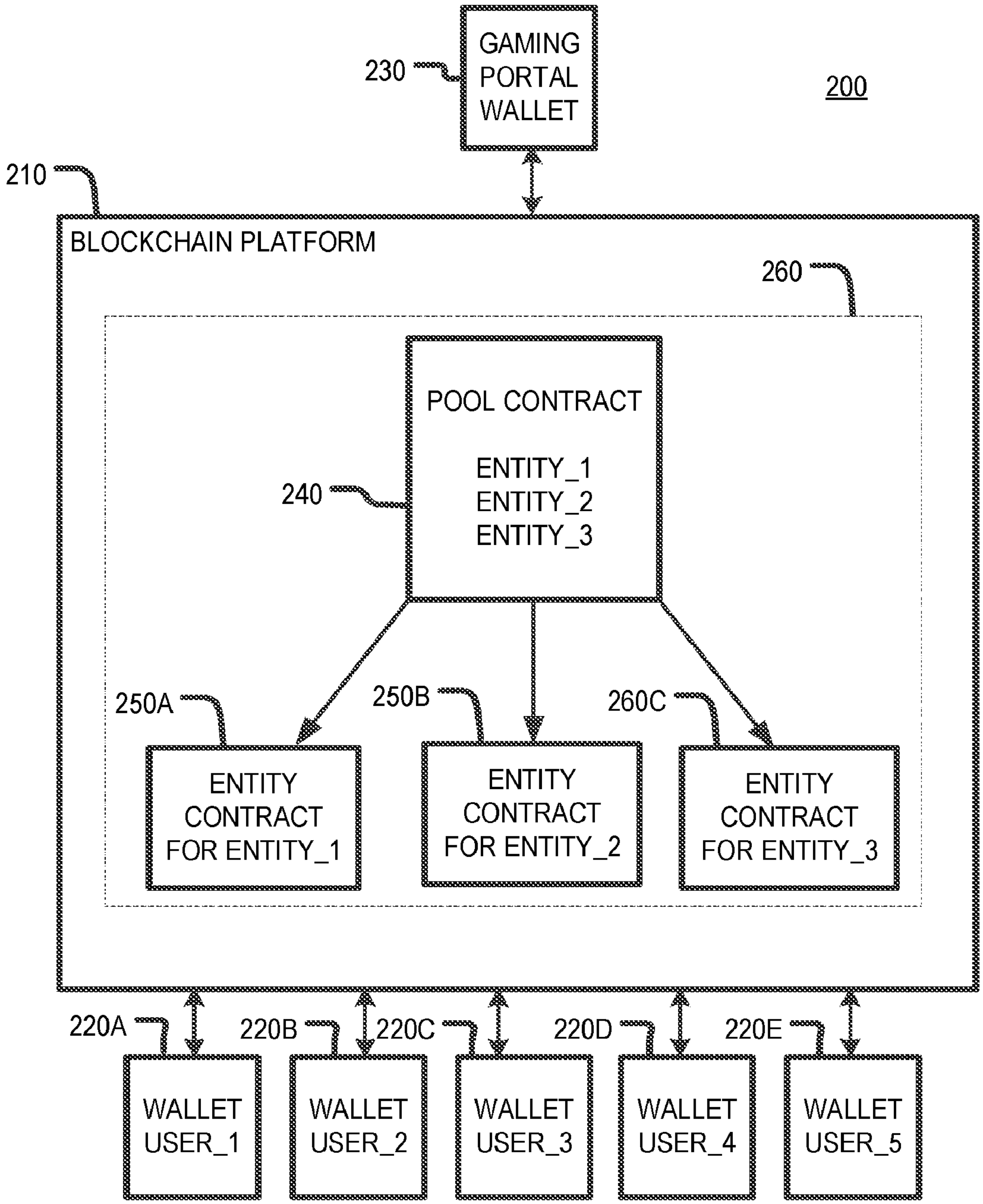
FIG. 2 is a diagram of an example of a blockchain platform that is executed on the system of FIG. 1, according to aspects of the disclosure.

The system 100 may be configured to operate as part of a blockchain platform 210, an example of which is shown in FIG. 2. The blockchain platform 210 may include a publicly managed blockchain platform (such as Ethereum or the like) or a privately managed platform (e.g., a blockchain controlled by a private entity). In some implementations, each of the computing devices 106 may be configured to mine and thereby validate transactions submitted to the blockchain platform 210. Similarly, any of the client devices 104 may also be configured to validate transactions submitted to the blockchain. Any of the client devices 104 may be configured to execute transactions on the blockchain platform 210. As is further discussed below, the transactions may include one or more of: (i) purchasing shares in a player (or another entity), (ii) selling shares to a player (or another entity), (iii) redeeming prizes (e.g., winnings) that are attributed based on ownership of shares in a player (or another entity). Each of the client devices 104 may be associated with a different user The gaming platform 108 may be configured to provision a market-based game for the users of the client devices 104. In some implementations, the gaming platform 108 may define a pool of players on the blockchain platform 210, and it may allocate a plurality of shares for each player in the pool, which the users of the client devices 104 can subsequently purchase. In addition, the gaming platform 108 may deploy logic (e.g., processor-executable instructions) on the blockchain platform 210, which when executed by the blockchain platform 210 causes the blockchain platform 210 to track the performance of the players in the pool, identify a player in the pool who is considered the best among the players of the pool based on one or more game rules, and prize the funds in the wallet to users who own shares in the best player. In some implementations, the game rules may provide that the player who has scored the most points during a predetermined period is the best. However, the present disclosure is not limited to any specific rule for determining which player is the best.

For example, the pool of players may include three quarterbacks that play in the National Football League™, herein referred to as player_1, player_2, and player_3. Each of the players may be associated with a plurality of shares, which the users of the client devices 104 can purchase. For example, the user of the client device 104*a* (hereinafter "user_1") may purchase 60% of the shares of player_1, and 30% of the shares in player_2, and 10% of the shares in player_3; the user of the client device 104*b* (hereinafter "user_2") may purchase 10% of the shares of player_1, and 20% of the shares in player_2, and 0% of the shares in player_3; the user of the client device 104*c* (hereinafter "user_3") may purchase 30% of the shares of player_1, and 20% of the shares in player_2, and 70% of the shares in player_3; the user of the client device 104*d* (hereinafter "user_4") may purchase 0% of the shares of player_1, 30% of the shares in player_2, and 0% of the shares in player_3; and the user of the client device 104*e* (hereinafter "user_4") may purchase 0% of the shares of player_1, 0% of the shares in player_2, and 20% of the shares in player_3. Table 1 below summarizes the distribution of shares in the players in the pool.

TABLE 1

Distribution of Shares Among the Players in the Pool

| USER | PLAYER_1 | PLAYER_2 | PLAYER_3 |
|---|---|---|---|
| USER_1 | 60% | 30% | 10% |
| USER_2 | 10% | 20% | 0% |
| USER_3 | 30% | 20% | 70% |
| USER_4 | 0% | 30% | 0% |
| USER_5 | 0% | 0% | 20% |

After the users have purchased their respective shares of players in the pool, the gaming platform 108 may, each week, deposit a predetermined amount of electronic funds in a digital wallet associated with the pool and provide one or more performance metrics (e.g. performance information) of the players in the pool to logic that is deployed by the gaming platform 108 on the blockchain platform 210. Upon receiving the performance metrics, the logic deployed by the gaming platform 108 may determine the number of goals which each of the players has scored during the week. Next, the logic may identify the player who has scored the most goals during the week. And finally, the logic may transfer funds in the wallets of users that own shares in the player who has scored the most goals (out of all players in the pool). Each user may be awarded shares in proportion to the user's ownership of shares in the player. For example, the user that owns 60% of the best player may receive 60% of the funds deposited by the gaming platform 108. And the user that owns 10 percent of the shares of the best player may receive 10% of the funds deposited by the gaming platform 108. The funds deposited by the gaming platform 108 may constitute a prize that is divided among users who own shares in one or more winning players. According to aspects of the disclosure, shares in any given player (or another entity) in a pool may be bought (or otherwise acquired) before the market-based game has commenced or at any other point after the commencement of the market-based game and before its completion.

FIG. 2 is a diagram of a system 200 for providing market-based games, such as the game described above. In the present example, the system 200 is implemented in software that is executed on the system 100. However, in some implementations, the system 200 may be implemented in hardware. Furthermore, in some implementations, a portion of the system 200 may be implemented in hardware while another portion is implemented in software. In the latter case, the portion of the system 200 that is implemented in hardware may be integrated into one or more of the devices that form the system 100. Accordingly, it will be understood that the present disclosure is not limited to any specific implementation of the system 200.

The system 200 may include the blockchain platform 210, a plurality of digital wallets 220, and/or a gaming platform wallet 230. In some implementations, the blockchain platform 210 may implement a distributed ledger that is available in its entirety to the participants in the blockchain platform 210 (e.g., the computing devices, 106, the client devices 104 and/or the gaming platform 108). Furthermore, the blockchain platform 210 may implement a peer-to-peer transaction mechanism that utilizes public-private key cryptography, has no central intermediary or central repository and allows all participants in the blockchain platform 210 to hold and validate a full copy of the ledger. In some implementations, the blockchain platform 210 may be maintained by a public distributed network, such as the Ethereum network or the like. Additionally or alternatively, in some implementations, the blockchain platform 210 may be managed by a privately-managed network. Furthermore, the type of implementation of the blockchain platform 210 (e.g., the hashing process associated with proof of work and/or consensus protocol) may vary, as well, in different implementations of the system 200. Stated succinctly, the present disclosure is not limited to any specific implementation of the blockchain platform 210 and modifications made thereto would still be within the scope and spirit of the present disclosure.

Any of the wallets 220 may be a key store application which may include, store, and/or otherwise control at least one private key along with a public key that corresponds to the private key. These keys enable the signing of transactions on the blockchain platform 210 and allow the client device of the user who owns the wallet to interact on behalf of the user with the blockchain platform 210. In some respects, controlling the private key represents control of an asset that is transacted using the public (or private) key, such as shares in a player or prize funds. Throughout the disclosure, references will be made to shares being "transferred" or "stored" in a wallet, even though in practice digital wallets do not actually store or hold assets. Accordingly, such references shall be interpreted as concerning transactions that are recorded on the blockchain platform 210 by using any of the keys in the wallet. According to the present disclosure, a transaction is considered recorded on the blockchain platform 210 if a representation of that transaction has been validated and stored on the ledger of the blockchain platform 210.

In the present example, the wallet 220A is provided on the client device 104A and it represents the user of the client device 104A (i.e., user_1); the wallet 220B is provided on the client device 104B and it represents the user of the client device 104B (i.e. user_2); the wallet 220C is provided on the client device 104C and it represents the user of the client device 104C (i.e. user_3); the wallet 220D is provided on the client device 104D and it represents the user of the client device 104D (i.e. user_4); and the wallet 220E is provided on the client device 104E and it represents the user of the client device 104E (i.e. user_5).

Although in the present example the wallets 220 are stored on the client devices 104, alternative implementations are possible in which the wallets are stored on the blockchain platform 210, and a respective image of each of the wallets 220 is stored on a different one of the client devices 104. It should also be noted that client devices 104A-E are referred to more generally as client devices 104 and wallets 220A-E are referred to more generally as wallets 220. It should be understood that there may be a greater or lesser number of client devices 104 and corresponding wallets 220 than those illustrated in the accompanying figures. Furthermore, alternative implementations are possible in which any of the wallets 220 is a hardware wallet. Stated succinctly, the present disclosure is not limited to any specific implementation of the wallets 220.

The gaming platform wallet 230 may be a key store application which may include, store, and/or otherwise control at least one private key along with a public key that corresponds to the private key. In the present example, the gaming platform wallet 230 is provided on the gaming platform 108 and it represents an entity which owns the gaming platform 108 (e.g., a company which distributes market-based games on the blockchain platform 210). Although in the present example the gaming platform wallet 230 is stored on the gaming platform 108, alternative implementations are possible in which the gaming platform wallet 230 is stored on the blockchain platform 210 and an image of the wallet is stored on the gaming platform 108. Furthermore, alternative implementations are possible in which the gaming platform wallet 230 is implemented in hardware. Stated succinctly, the present disclosure is not limited to any specific implementation of the gaming platform wallet 230 and that various modifications may be made thereto without departing from the scope and spirit of the present disclosure.

In some implementations, the blockchain platform 210 may execute logic 260 for providing a market-based game. The logic 260 may be allocated on the blockchain platform 210 by the gaming platform 108. In the example of FIG. 2, the logic 260 is represented by contracts 240, 250A, 250B, and 250C. However, alternative implementations are possible in which the logic 260 is organized in another modular arrangement. For example, in some implementations, the entire logic 260 may be implemented using a single contract. Stated succinctly the present disclosure is not limited to any specific organization of the logic 260 for providing a market-based game as the specifically disclosed logic 260 is merely one illustrative, non-limiting example.

According to the present disclosure, any contract that is deployed on the blockchain platform 210 may include processor-executable instructions that are executed and/or validated by one or more nodes in the blockchain platform 210. Any contract that is deployed on the blockchain platform 210 may be viewed as an autonomous agent that is executed inside the environment of the blockchain platform 210 always executing a specific code when triggered by a message or transaction and having a direct control over their own key store (e.g., wallet) to keep track of persistent variables. In some respect, implementing the market-based game using blockchain contracts is advantageous as it permits users to participate in the market-based game without the need for a centralized broker, resulting in increased scalability and trust in the market-based game conducted by executing the logic 260.

In some implementations, the logic 260 may define a pool of entities (e.g., players) by deploying a plurality of first tokens on the blockchain platform 210. Each token in the plurality may represent a different entity in the pool. In some implementations, each token may be allocated by executing (on the blockchain platform 210) a transfer transaction from the gaming platform wallet 230 to a pool-specific wallet that is allocated on blockchain platform 210 and which represents the pool. In the present example, the entities that are represented by the token may be players (i.e., athletes). However, the entities that are represented in the pool may include any suitable type of entity whose performance can be compared to the performance of the other entities in the pool based on one or more rules that are defined by the logic 260. The present disclosure is not limited to any specific type of entity and/or set of rules for comparing the performance of the entities.

In some implementations, the logic 260 may define a plurality of shares for each of the entities in the pool. In some implementations, the shares for any given one of the entities in the pool may be allocated by executing (on the blockchain platform 210) a transfer transaction from the gaming platform wallet 230 to a wallet associated with a given one of the entities. After the shares for a given one of the entities in the pool are allocated, the shares may be purchased by the users of the client devices 104. When shares for any of the entities are purchased (or otherwise obtained) by a user, those shares may be stored in the respective wallet 220 that is associated with that user.

In some implementations, the gaming platform 108 may allocate a pool-specific prize for the market-based game that is conducted using the logic 260. The prize for the game may be allocated be executing (on the blockchain platform 210) a transfer transaction from the gaming platform wallet 230 to the pool-specific wallet, which transfers electronic assets (e.g., electronic funds and/or any other suitable representation of the pool-specific prize) into the pool-specific wallet. According to the present disclosure, the term "pool-specific prize" may refer to a prize which can be awarded to at least one of the users that participate in the market-based game depending on the outcome of the market-based game. In this regard, the pool-specific prize may be the total prize that is up for distribution among the participants in the market-based game during a particular round of the market-based game (or during the entire run of the market-based game).

In some implementations, the logic 260 may obtain (e.g., from an oracle) performance information for each entity in the pool. In some implementations, the performance information may include any suitable type of information that allows the entities to be compared and ranked against one another in accordance with rule(s) defined by the logic 260. For example, in instances in which the entities in the pool are football players, the performance information may include the number of goals which each of the players has scored in the past week. In some implementations, the logic 260 may rank the entities in the pool based on the performance information. In some implementations, the ranking of the entities in the pool may produce an ordered list (e.g., a ranking list) in which the entities are arranged based on their performance, such that any entity in the pool that has performed better than another entity in the pool (e.g., during a predetermined period) is identified before the other entity in the list. For example, in instances in which the entities in the pool are football players, the list may first identify the players who have scored the most goals.

In some implementations, the logic 260 may determine a respective entity-specific (e.g., player-specific) prize for at least some of the entities in the pool. The entity-specific prize for any given entity may include the portion of the pool-specific prize that is to be awarded to users who own shares in the given entity. The entity-specific prize may be determined by applying one or more rules of the market-based game that are defined in the logic 260. For example, such rules may provide that the entity-specific prize for the entity in the pool that has the best performance is equal to 100% of the pool-specific prize, effectively requiring the pool-specific prize to be divided only among users who own shares in the best-performing entity. For example, in instances in which the entities in the pool are football players, the entity that has the best performance may be the football player that has scored the most goals among the football players in the pool (e.g., during a predetermined period).

As another example, the rules may provide that the entity-specific prize for the entity in the pool that has performed best is equal to 70% of the pool-specific prize, and the pool-specific prize for the entity in the pool that has performed second best is equal to 30% of the pool-specific prize, effectively requiring the pool-specific prize to be divided only among users who own shares in the two best entities. For example, in instances in which the entities in the pool are football players, the two best entities may be the top-two football players who have scored the most goals out of all football players in the pool. In some implementations, the rules for determining player-specific prizes may be one or more rules which provide how the pool-specific prize shall be divided among N-best performing entities in the pool, wherein N is an integer greater than or equal to 1 and less than the total number of entities in the pool.

In some implementations, after the entity-specific prizes are determined, the entity-specific prize for any given entity may be transferred from the pool-specific wallet to an entity-specific wallet that is associated with the given entity. Transferring the entity-specific prize may include deducting an amount of electronic funds from the pool-specific wallet that is equal to the entity-specific prize and adding this amount (minus any transaction fees) to an entity-specific wallet that is associated with the entity.

In some implementations, the logic 260 for providing a market-based game may determine user-specific prizes for users who participate in the market-based game. The user-specific prize for any of the users may be the amount of electronic funds which a user is set to receive based on the user's ownership of shares in an entity in the pool that has been accorded an entity-specific prize by the logic 260. For example, if a user owns 20% of shares in one of the entities of the pool, that user may receive 20% of the entity-specific prize for that entity.

In some implementations, the logic 260 may provide the user-specific prize that is owed to a user by transferring the user-specific prize from an entity-specific wallet that is associated with an entity of which the user owns shares to a wallet that is associated with the user. Transferring the user-specific prize may include deducting an amount of electronic funds from the entity-specific wallet that is equal to the entity-specific prize and adding this amount (minus any transaction fees) to the user's wallet 220. Additionally or alternatively, in some implementations, the logic 260 may provide the user-specific prize that is owed to a user by executing a transaction on the blockchain platform 210 which makes the user-specific prize available for redemption to the user. After the user-specific prize is made available for redemption by the user, the user may initiate a transaction on the blockchain platform 210 which transfers the user-specific prize from an entity-specific wallet that is associated with an entity of which the user owns shares to a wallet that is associated with the user. Stated succinctly, the present disclosure is not limited to any specific way of providing use-specific prizes to users who participate in a market-based game deployed by the gaming platform 110.

Although in the example of FIG. 2 the logic 260 receives performance information corresponding to the entities in the pool and ranks the entities in the pool by itself, alternative implementations are possible in which the logic 260 is configured to receive a ranking list for the entities in the pool that is provided by an oracle or another trusted entity. In such instances, the logic 260 may not rank the entities in the pool by itself and may instead rely on the rankings that are provided in the list. For example, in instances in which the entities in the pool are football players, the performance information may indicate the ranking position of each player in the pool. For example, the ranking list may indicate which player is ranked first, which player is ranked second, and so forth. In some implementations, the ranking list may be provided to the logic 260 by the gaming platform 108.

Figure 3:
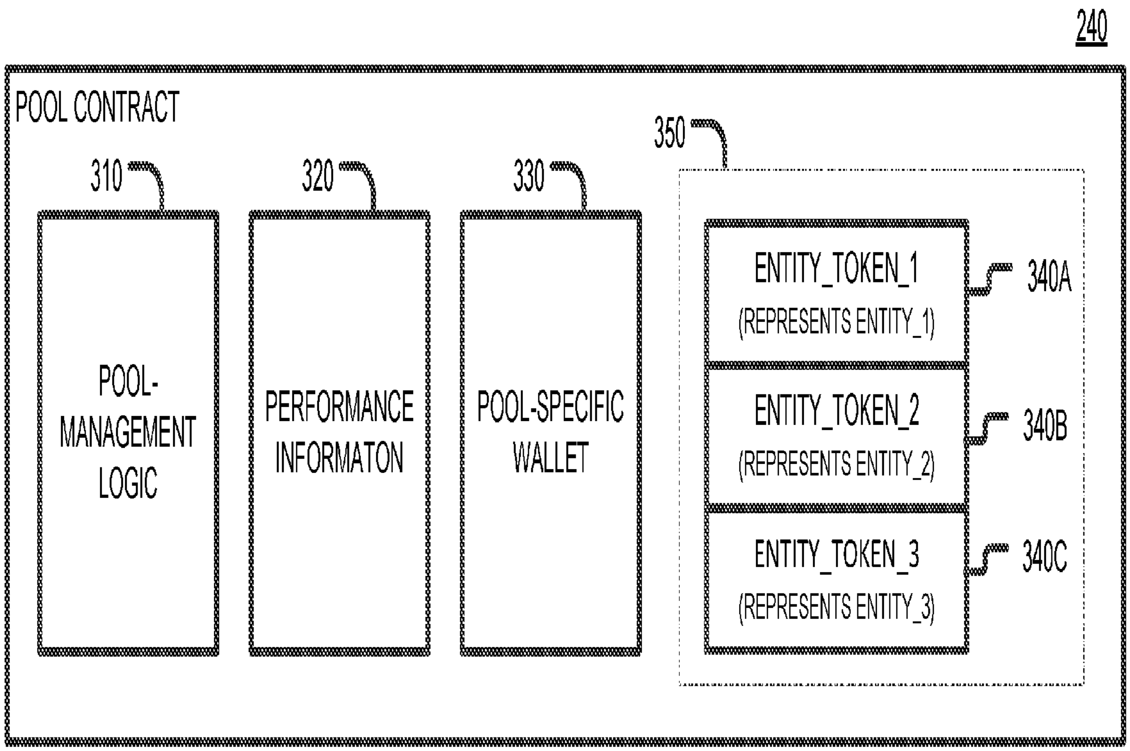
FIG. 3 is a diagram of an example of a pool contract that is allocated on the blockchain platform of FIG. 2.

FIGS. 3-6 provide an example, of one particular implementation of the logic 260, according to aspects of the disclosure. Shown in FIG. 3 is an example of the pool contract 240, in accordance with one particular implementation. As illustrated, the pool contract 240 may include a pool-management logic 310, performance information 320, a pool-specific wallet 330, and a plurality of tokens 340 which together define a pool of entities 350. The pool-management logic 310 may include one or more processor-executable instructions which when executed by one or more nodes in the blockchain platform 210 cause the blockchain platform 210 to perform the process 400, which is discussed further below with respect to FIG. 4. The performance information 320 may include one or more data structures which include information regarding the performance of the entities in the pool 350. The pool-specific wallet 330 may be a wallet which is used to store a pool-specific prize for the pool 350 and/or store the tokens 340 which define the pool 350. In the present example, the entities represented by the tokens 340 are real-life football players and the performance information 320 identifies the number of goals each of the football players has scored (in real life) during a past period of time (e.g., in the past week).

Each of the tokens 340 may represent a different one of the entities in the pool 350. Each of the tokens 340 may be represented as a transaction that is recorded on the ledger of the blockchain platform 210 and stored in the pool-specific wallet 330. In some implementations, each token 340 (or transaction corresponding to the token 340) may include an identifier of the entity that is represented by that token 340 (e.g., the name of a real-life football player that is represented by the token). Moreover, in some implementations, each token 340 (or transaction corresponding to the token 340) may include an identifier of the pool 350. Alternatively, in some implementations, the pool to which any given token 340 belongs may be identified implicitly by the pool-specific wallet in which the token 340 is stored. In some implementations, each of the tokens 340 may be a non-fungible token which is neither divisible nor interchangeable.

Figure 4:
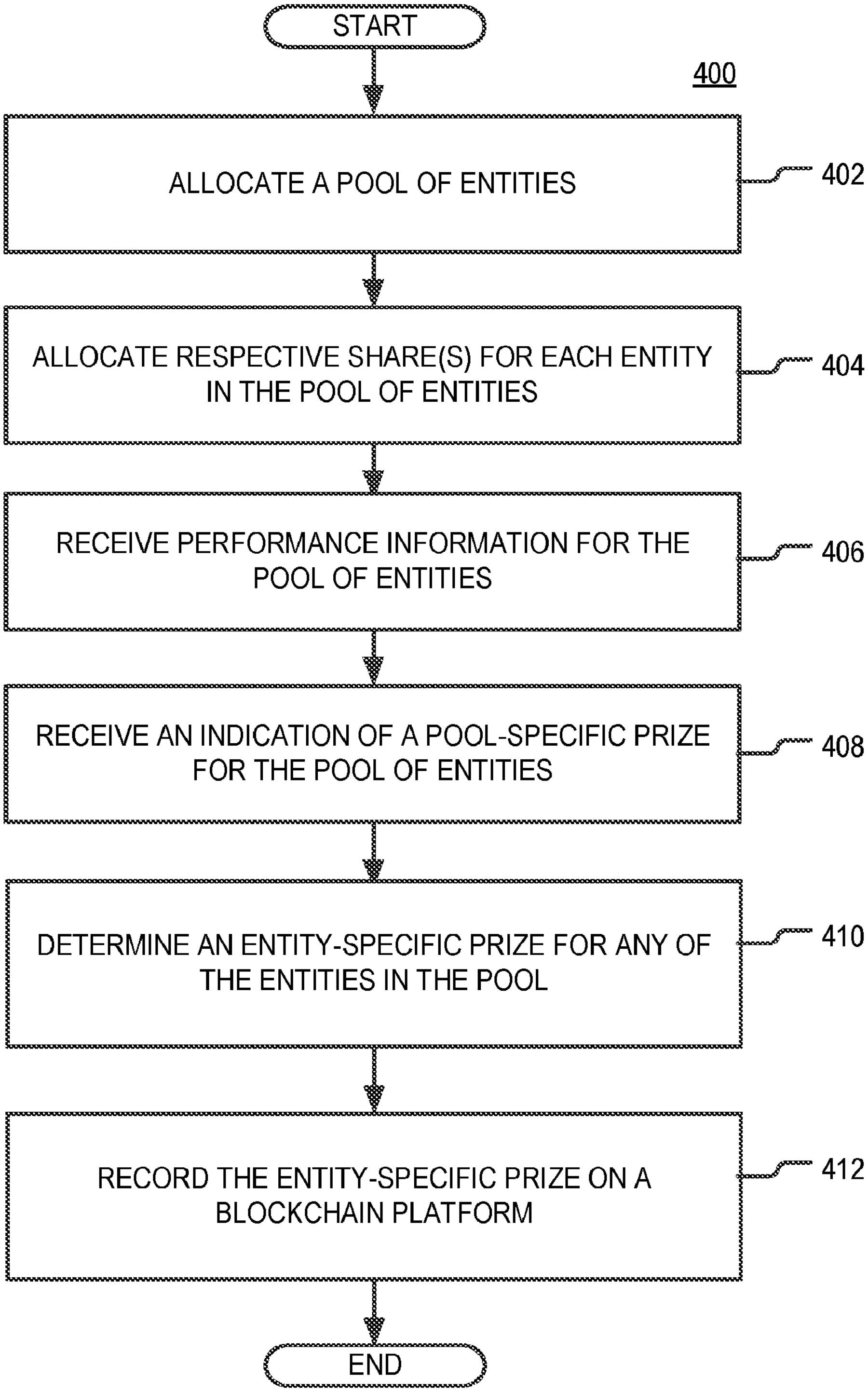
FIG. 4 is a flowchart of an example of a process that is performed by the pool contract of FIG. 3, according to aspects of the disclosure.

FIG. 4 is a flowchart of an example of a process 400 which is performed by the pool contract 240 (and/or the pool-management logic 310), according to aspects of the disclosure.

At step 402, the pool contract 240 may allocate the pool of entities 350. Allocating the pool of entities 350 may include allocating the tokens 340. In some implementations, allocating any of the tokens 340 may include recording a transaction in the ledger of the blockchain platform 210 which causes the tokens 340 to become instantiated.

At step 404, the pool contract 240 may allocate respective share(s) for each of the entities in the pool. According to the present disclosure, a respective share for a given entity in the pool 350 is represented as a respective share in the token 340 which represents that entity. The respective share(s) in any token 340 may be represented by tokens 530 (shown in FIG. 5) which are recorded as transactions in the blockchain platform 210. In some implementations, allocating any of the tokens 530 may include recording a transaction in the ledger of the blockchain platform 210 from the pool-specific wallet 330 to any of the wallets 220 (and/or the entity specific wallet 520), which causes any of the tokens 530 to become instantiated.

At step 406, the pool contract 240 may receive performance information for the entities in the pool 350. The performance information may include any suitable type of information that allows the performance of the entities to be compared based on one or more rules defined by the pool-management logic 310. In instances in which all entities are football players, the performance information may include the number of goals which each of the players has scored during a past period and/or any other suitable metric of the players' performance. In instances in which the entities are athletes that compete in different sports, the performance information may include the number of wins which each athlete has scored during a past period. The performance information may be received at the pool contract 240 from an oracle that is associated with the pool contract 240. The oracle can be any suitable agent that finds and verifies real-world information about the performance of the entities that are represented by the tokens 340 in the pool 350. The oracle may be managed by the gaming platform 108 and/or a third party.

At step 408, the pool contract 240 receives an indication of a pool-specific prize that is up for distribution among users who own shares in entities from the pool 350. In some implementations, the indication of the pool-specific prize may be received when a transaction is recorded on the blockchain platform 210 which transfers electronic funds or another type of electronic assets (in the amount of the pool-specific prize) from the gaming platform wallet 230 of the gaming platform 108 to the pool-specific wallet 330 of the pool contract 240.

At step 410, the pool contract 240 determines an entity-specific prize for one or more of the entities in the pool 350. As discussed above, in some implementations, determining the entity-specific prize may include ranking the entities in the pool 350 based on the performance information 320 and calculating a respective entity-specific prize for an N-number of entities that rank first, wherein N is greater than or equal to one and less than the total number of entities in the pool.

At step 412, the entity-specific prizes determined at step 406 are recorded in the ledger of the blockchain platform 210. In some implementations, recording the entity-specific prize for a given entity may include transferring electronic funds or another type of electronic assets (in the amount of the given entity-specific prize) from the pool-specific wallet 330 of the pool contract 240 to a wallet that is associated with the given entity, such as the wallet 520 which is shown in FIG. 5.

Although in the example of FIGS. 3-4 the pool contract 240 receives performance information corresponding to the entities in the pool and ranks the entities in the pool by itself, alternative implementations are possible in which the pool contract 240 is configured to receive a ranking list for the entities in the pool that is provided by an oracle or another trusted entity. In such instances, the pool contract 240 may not rank the entities in the pool by itself and may instead rely on the rankings that are provided in the list. Moreover, in such instances, step 402 may be omitted from the process 400. The process 400 is provided as an example only, at least some of the steps in the process 400 may be performed concurrently, performed in a different order, or altogether omitted.

Figure 5:
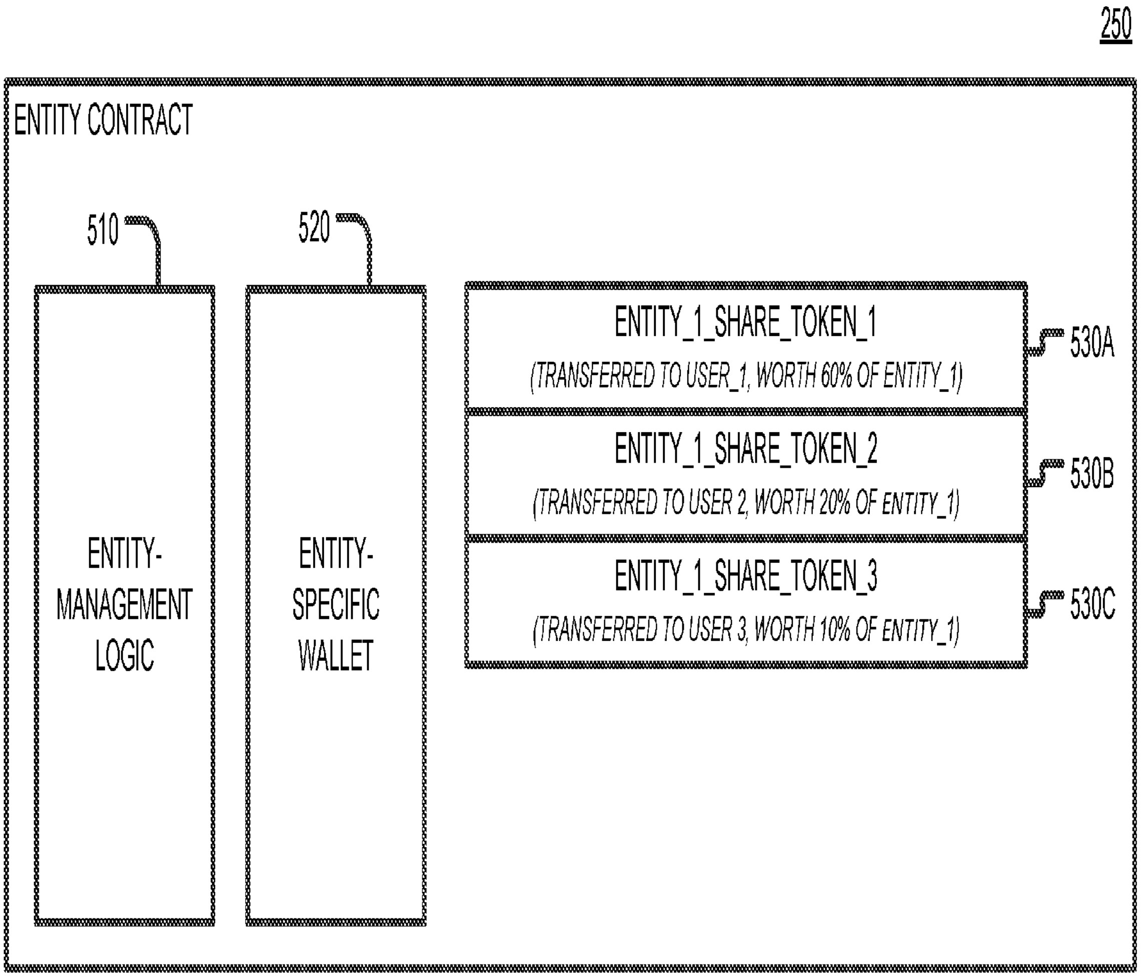
FIG. 5 is a diagram of an example of an entity contract that is allocated on the blockchain platform of FIG. 2, according to aspects of the disclosure.

FIG. 5 shows an example of an entity contract 250, in accordance with one particular implementation. According to the present disclosure, the entity contract 250 may be representative of any one of the contracts 250A, 250B, and 250C, which are shown in FIG. 2. As illustrated, the entity contract 250 may include entity-management logic 510, a wallet 520, and a plurality of tokens 530 which represents the shares in an entity that correspond to the contract. The entity-management logic 510 may include one or more processor-executable instructions which when executed by one or more nodes in the blockchain platform 210 cause the blockchain platform 210 to perform the process 600, which is discussed further below with respect to FIG. 6. The wallet 520 may be any suitable digital wallet that is configured to store entity-specific prize(s) that correspond to the entity which the tokens 530 represent shares.

Each of the tokens 530 may represent a respective share in one of the entities in the pool 350. More specifically, on the blockchain platform 210, each of the tokens 530 may represent a different share in one of the tokens 340. Each of the tokens 530 may be represented as a transaction that is recorded on the ledger of the blockchain platform 210 and stored in the wallet of the user who owns the token (and/or share represented by the token). In some implementations, each token 530 (or transaction corresponding to the token 530) may include an identifier of the token 340 which the token 530 represents a share of. In some implementations, each of the tokens 530 may be a fungible token that is interchangeable and/or divisible.

In the present example, the token 340*a* represents a real-life entity, herein referred to as "entity_1". Token 530*a* represents a 60% share of the token 340*a*, token 530*b* represents a 20% share of the token 340*a*, and token 530*c* represents a 10% share of the token 340*a*. The token 530*a* belongs to the user of client device 104*a* (i.e., user_1), and as such it is stored in the wallet 220*a*. The token 530*b* belongs to the user of client device 104*b* (i.e., user_2), and as such it is stored in the wallet 220*b*. And the token 530*b* belongs to the user of client device 104*c* (i.e., user_3), and as such it is stored in the wallet 220*c*. As can be readily appreciated, ownership of a share in the token 340*a* represents, by proxy, ownership in entity_1, within the context of the pool 350. Although not shown, in some implementations, the wallet 520 may also store information identifying which user owns what shares of the token 340*a*, in order to facilitate the execution of the entity-management logic 510.

Although in the example of FIG. 5, the respective share in an entity that belongs to a given user is represented by a single token, it will be understood that in practice the respective share in an entity that belongs to a given user may be represented by multiple tokens. In this regard, token 530*a* may include one or more tokens; token 530*b* may include one or more tokens; token 530*c* may include one or more tokens; and token 530*d* may include one or more token. The present disclosure is not limited to any specific way of representing entity shares on a blockchain platform.

Figure 6:
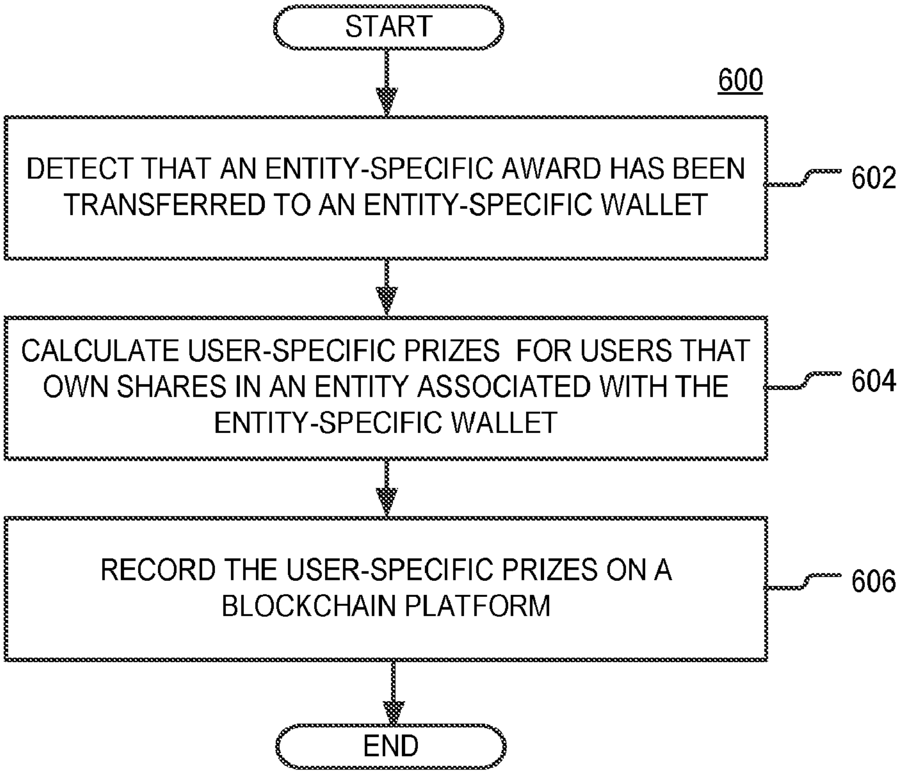
FIG. 6 is a flowchart of an example of a process that is performed by the entity contract of FIG. 5, according to aspects of the disclosure.

FIG. 6 is a flowchart of an example of a process 600 that is performed by the entity contract 250 (and/or the entity-management logic 510), according to aspects of the disclosure.

At step 602, the entity contract 250 detects that an entity-specific prize has been transferred to the wallet 520.

At step 604, the entity contract 250 determines the user-specific prize which each user that owns shares in the token 340*a* is set to receive in accordance with one or more distribution rules that are implemented in the entity-management logic 510. For example, the entity contract 250 may determine that the user-specific prize for the user that owns 60% of the shares in the token 340*a* is equal to 60% of the entity-specific prize for the token 340*a* (or entity represented by the token 340*a*). Furthermore, the entity contract 250 may determine that the user-specific prize for the user that owns 30% of the shares in the token 340*a* is equal to 30% of the entity-specific prize for the token 340*a* (or entity represented by the token 340*a*). And still furthermore, the entity contract 250 may determine that the user-specific prize for the user that owns 10% of the shares in the token 340*a* is equal to 10% of the entity-specific prize for the token 340*a* (or entity represented by the token 340*a*). Although in the present example the portion of the entity-specific prize which each user is set to receive is equal to the percentage of shares which the user owns in the token 340*a*, it will be understood that the present disclosure is not limited to any specific formula for dividing entity-specific prizes into user-specific prizes.

At step 606, the entity contract 250 records each user-specific prize on the blockchain platform 210. In some implementations, recording the user-specific prize for any of the users that own shares in the token 340*a* may include transferring electronic funds or another type of electronic assets (in the amount of the user's user-specific prize) from the wallet 520 to the user's wallet 220. After the electronic funds (or other electronic assets) are transferred to the user's wallet, those funds (or other assets) can be redeemed by the user for cash (e.g., from the gaming platform 108) or exchanged for a digital currency, such as bitcoin. The process 600 is provided as an example only, at least some of the steps in the process 600 may be performed concurrently, performed in a different order, or altogether omitted.

Figure 7:
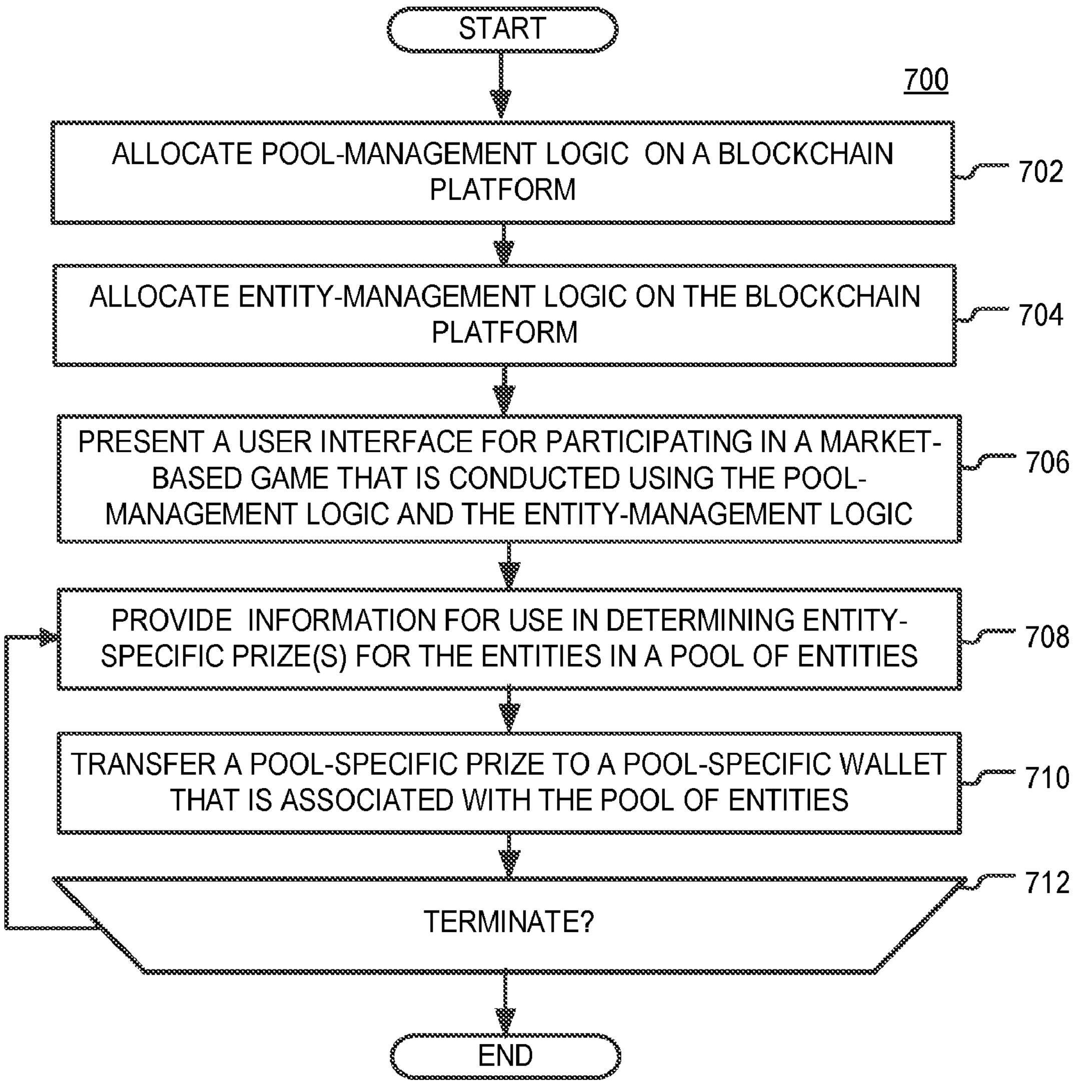
FIG. 7 is a flowchart of an example of a process, according to aspects of the disclosure.

FIG. 7 is a flowchart of an example of a process 700 for provisioning a market-based game that is performed by the gaming platform 108, according to aspects of the disclosure.

At step 702, the gaming platform 108 may allocate a pool-management logic instance on the blockchain platform 210. The pool-management logic may include one or more processor-executable instructions which when executed by one or more nodes in the blockchain platform 210 cause the one or more nodes to allocate a pool of entities on the blockchain platform 210. Allocating the pool of entities may include allocating a plurality of first tokens (e.g., non-fungible tokens), wherein each of the first tokens represents a different entity in the pool. Allocating any of the first tokens may include recording a transaction on the ledger of the blockchain platform 210 which causes the first tokens to become instantiated. In some implementations, the tokens allocated by the pool-management logic may be the same or similar to the tokens 340.

Additionally or alternatively, in some implementations, the pool-management logic may include one or more processor-executable instructions which when executed by one or more nodes in the blockchain platform 210 cause the one or more nodes to: receive performance information for each of the entities in the pool, rank the entities in the pool based on the performance information, calculate a respective entity-specific prize for any of the entities in the pool, and record the entity-specific prize on the blockchain platform 210. In some implementations, the pool-management logic may be the same or similar to the pool-management logic 310. The list of steps performed by the pool-management logic is provided as an example only. In this regard, it will be understood that alternative implementations are possible in which any of the steps in the list can be omitted. Furthermore, it will be understood that at least some of the steps in the list can be performed concurrently with one another or in a different order.

At step 704, the gaming platform 108 may allocate a respective entity-management logic instance for each of the entities in the pool that is allocated at step 702. The entity-management logic for any given entity may include one or more processor-executable instructions which when executed by one or more nodes in the blockchain platform 210 cause the one or more nodes to: calculate a user-specific prize for any user that owns shares in a token (e.g., token 340) representing the given entity, and record the user-specific prize on the blockchain platform 210. In some implementations, any entity-management logic instance may be the same or similar to the entity-management logic 510. The list of steps performed by each entity-management logic instance is provided as an example only. In this regard, it will be understood that alternative implementations are possible in which any of the steps in the list can be omitted. Furthermore, it will be understood that at least some of the steps in the list can be performed concurrently with one another or in a different order.

Additionally or alternatively, in some implementations, any entity-management logic instance may include trading logic for buying and selling shares in the logic instance's given entity. The trading logic may include one or more processor-executable instructions which when executed by one or more nodes in the blockchain platform 210 cause the one or more nodes to record one or more transactions in the ledger of the blockchain platform 210 which transfer ownership of share(s) in the given entity. In some implementations, the trading logic may implement a transaction fee which is charged on a per transaction basis for each transaction transferring one or more shares in entity from one user for another. In some implementations, the transaction fee may be a percentage of the entire amount of shares that is being transferred, in a transaction, from one user to another. For example, the trading logic may implement transferring 5% of the shares, which are subject of any transaction between two users, to the wallet 230, which is associated with the gaming platform 108, as a fee for recording transaction. According to aspects of the disclosure, shares in an entity do not necessarily need to be purchased in order for the shares to be acquired by a user. For example, the shares may be bartered for other shares and/or traded in any other suitable manner.

At step 706, the gaming platform 108 may present a user interface for participating in the market-based game that is provisioned by the gaming platform 108. In some implementations, presenting the user interface may include transmitting one or more processor-executable instructions from the gaming platform 108 to any of the client devices 104, which when received by the client device 104 cause the client device to display a graphical user interface on a display screen of the client device 104. The graphical user interface may include one or more screens which provide one or more of the following:

(i) an identification of at least one pool that is currently active on the blockchain platform 210;

(ii) an indication of the entities that are part of the pool;

(iii) a marketplace where users can trade shares in the entities in the pool;

(iv) an indication of the different shares that form the portfolio of any given user that participates in the market-based game that is provisioned by the gaming platform 108.

(v) performance information corresponding to any of the entities in the pool which can be used by participants in the market-based game to decide whether to buy shares in that entity (or more specifically, in a token representing that entity).

At step 708 the gaming platform 108 transmits, to the pool-management logic, information for that can be used in determining entity-specific prize(s) for the entities in the pool. In some implementations, the provided information may be the same or similar to the performance information 320. Additionally or alternatively, in some implementations, the provided information may include a ranking list which identifies a respective rank for each (or at least some) of the entities in the pool. In some implementations, the ranking list may rank the entities in the pool relative to one another. Additionally or alternatively, in some implementations, the ranking list may indicate a different rank for each of the entities in the pool.

At step 710, the gaming platform 108 may transfer a pool-specific prize to a pool-specific wallet, such as the pool-specific wallet 330, which is associated with the pool allocated with 702. After the pool-specific prize is transferred, the pool-specific prize may be divided among at least some of the users that own shares in entities that are part of the pool. In some implementations, the pool-specific prize may be divided as discussed with respect to the processes 400 and 600, which are discussed above with respect to FIGS. 4 and 6.

At step 712, the gaming platform 108 may determine whether to terminate the process. If a determination is made to terminate the process 700, the process ends. If a determination is made to continue executing the process 700, the process 700 returns to step 708. In some implementations, steps 708 and 710 may be performed periodically (e.g., every week, every month, etc.). As a result, a new pool-specific prize may be distributed among the users who participate in the market-based game during each period.

In some implementations, each (weekly) pool-specific prize may be a portion of a larger pool-specific jackpot. In some implementations, the pool-specific jackpot may be a portion (e.g., 80%) of the proceeds from an initial sale of shares in the entities in the pool. Although in the present example the pool-specific jackpot and the pool specific prizes are based on the proceeds of share sales, alternative implementations are possible in which the pool-specific jackpot and/or any of the pool-specific prizes is independent of the any proceeds form the sale of shares in the entities in the pool. In such instances, the amount of the pool-specific jackpot and/or any of the pool specific prizes may be set by the gaming platform 108 independently of any proceeds from the sale of shares in the entities in the pool.

Figure 8:
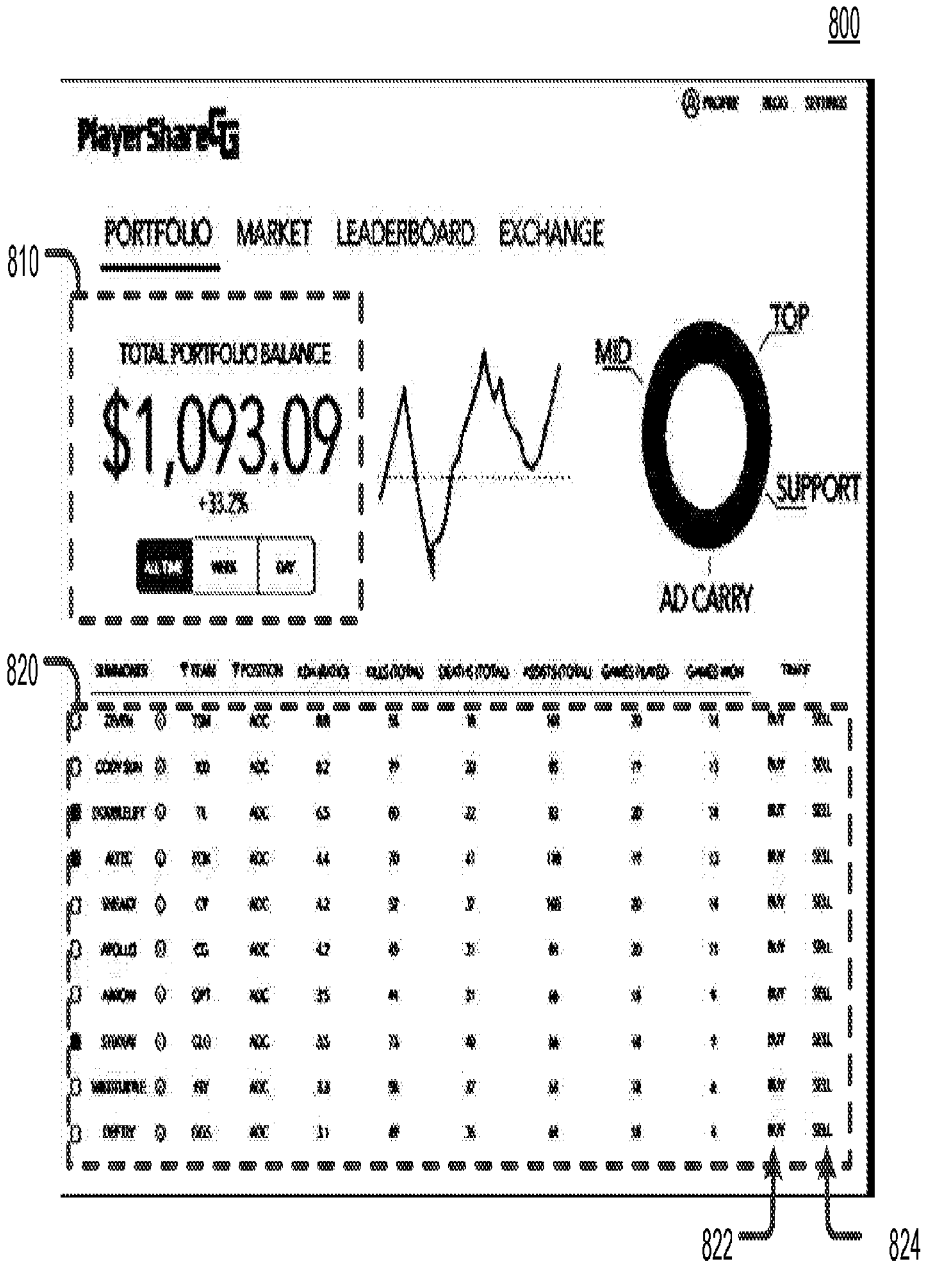
FIG. 8 is a diagram of an example of a graphical user interface according to aspects of the disclosure.

FIG. 8 is a diagram of an example of a user interface screen 800, which may be provided by the gaming platform 108 to any user that participates in a market-based game that is provisioned by the gaming platform 108. As illustrated, the user interface screen 800 may include a first portion 810, which identifies the total worth of the user's portfolio. Furthermore, the user interface screen 800 may include a second portion 820 that identifies one or more entities that are part of a pool. For each of the entities, the second portion 820 may provide various types of information that can be utilized by the user to determine whether the user wants to buy and/or sell shares in that entity. In addition, for each of the entities, the second portion 820 may include a respective buy button 822. When the buy button 822 corresponding to a given entity is activated (e.g., pressed), the user interface screen 800 may be hidden, and a marketplace screen (not shown) may be displayed in its place. The marketplace screen may identify one or more other users who are willing to sell shares in the given entity, and with whom the user can interact directly, over the blockchain platform 210. Furthermore, for each of the entities, the second portion 820 may include a respective sell button 824. When the sell button 824 corresponding to a given entity is activated (e.g., pressed), the user interface screen 800 may be hidden, and a marketplace screen (not shown) may be displayed in its place. The marketplace screen may identify one or more other users who are willing to buy shares in the given entity, and with whom the user can interact directly, over the blockchain platform 210.

Figure 9:
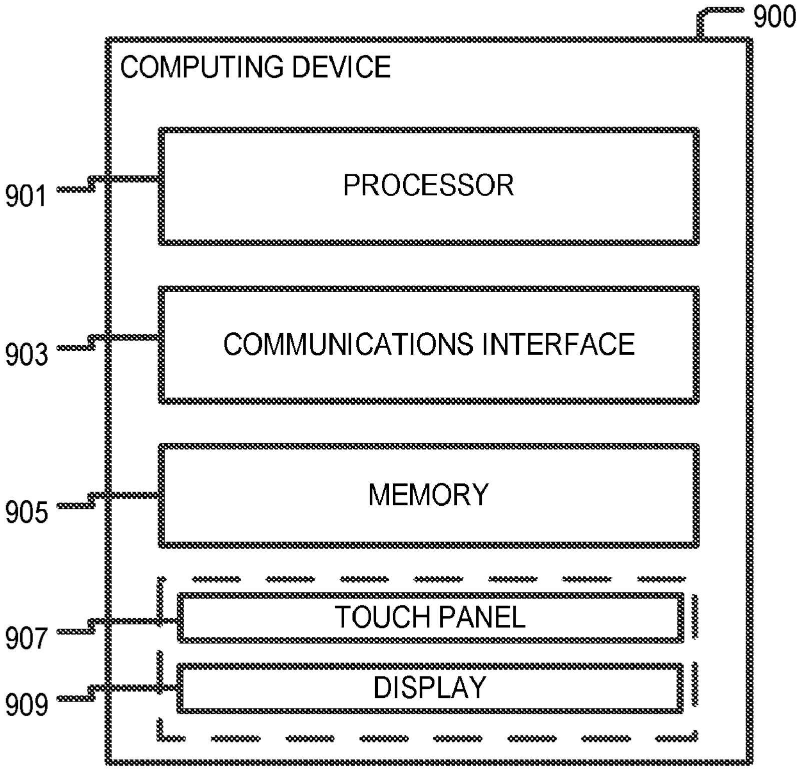
FIG. 9 is a diagram of an example of a computing device, according to aspects of the disclosure.

FIG. 9 is a diagram of an example of a computing device 900, according to aspects of the disclosure. As illustrated, the computing device 900 may include a processor 901, a communications interface 903, a memory 905, a touch panel 907, and a display 909. According to aspects of the disclosure, the processor 901 may include any suitable type of processing circuitry, such as a general-purpose processor (e.g., an ARM-based processor), an application-specific integrated circuit (ASIC), or a Field-Programmable Gate Array (FPGA). The communications interface 903 may include any suitable type of communications interface, such as a Wi-Fi interface, an Ethernet interface, a Long-Term Evolution (LTE) interface, a Bluetooth Interface, an Infrared interface, etc. The memory 905 may include any suitable type of volatile and non-volatile memory, such as random-access memory (RAM), read-only memory (ROM), flash memory, cloud storage, or network accessible storage (NAS), etc. The touch panel 907 may include any suitable type of touch panel, such as a capacitive or resistive touch panel. The display 909 may include any suitable type of display such as a liquid crystal display (LCD), a light-emitting diode (LED) display, or an active-matrix organic light-emitting diode (AMOLED) display. In some implementations, the touch panel 907 may be layered onto the display 909 to form a touchscreen. Although not shown, the computing device 900 may include additional (or alternative) input devices, such as a microphone, a keyboard, a mouse, etc.

In some implementations, the computing device 900 may be the same or similar to any of the client devices 104. Additionally or alternatively, in some implementations, the computing device 900 may be the same or similar to any of the computing devices 106. Additionally or alternatively, in some implementations, the computing device 900 may be the same or similar to any of the computing devices that might form the gaming platform 108

FIGS. 1-9 are provided to illustrate a particular implementation of the present disclosure and not intended to limit the disclosure. It will be understood that any of the steps in the processes 400, 600, and 700 may be performed concurrently with other steps in those processes and altogether omitted. It will be further understood that the provision of the examples described herein, as well as clauses prefaced with "such as," "e.g.", "including", "in some aspects," "in some implementations," and the like should not be interpreted as limiting the disclosed subject matter to the specific examples.

While the present disclosure may have been shown and described with reference to various embodiments thereof, it will be understood by those skilled in the art that various changes in form and details may be made therein without departing from the spirit and scope of the present disclosure as defined by the appended claims and their equivalents. In other words, the various exemplary embodiments disclosed in the present specification and drawings are merely specific embodiments to facilitate an understanding of the various aspects of the present disclosure and are not intended to limit the scope of the present disclosure. Therefore, the scope of the present disclosure is defined not by the detailed description of the disclosure but by the appended claims, and all differences within the scope should be construed as being included in the present disclosure.

The invention claimed is:

1. A method for provisioning a market-based game on a blockchain platform, said method comprising:

allocating pool-management logic on the blockchain platform, the pool-management logic including one or more processor-executable instructions that when execute cause the blockchain platform to:

allocate a plurality of non-fungible tokens, wherein each of the non-fungible tokens represents a different real-life entity in a pool of real-life entities;

allocate, for each of the plurality of non-fungible tokens, one or more corresponding fungible tokens that represent shares in each of the non-fungible tokens; and calculating an entity-specific prize corresponding to a real-life entity in the pool of real-life entities based on a rank of the real-life entity in the pool of real-life entities and a pool-specific prize associated with the pool of real-life entities, the real-life entity being represented by one of the plurality of non-fungible tokens.

2. The method of claim 1, further comprising:

calculating a user-specific prize based on the entity-specific prize and a number of shares in the one of the non-fungible tokens that is stored in a user wallet, and execute a transaction on the blockchain platform providing the user-specific prize to an owner of the user wallet.

3. The method of claim 1, further comprising:

replenishing the pool-specific prize by transferring electronic funds to a pool wallet that is associated with the pool of real-life entities for further distribution by the pool-management logic and the entity-management logic.

4. The method of claim 1, wherein:

providing the user-specific prize to the owner of the user wallet includes transferring the user-specific prize to the user wallet.

5. The method of claim 1, further comprising:

transmitting to the pool-management logic an indication of the rank of the real-life entity.

6. The method of claim 1, wherein the pool-management logic includes one or more processor-executable instructions, which when executed by the blockchain platform, cause the blockchain platform to receive an indication of the rank of the real-life entity.

7. The method of claim 1, wherein:

allocating the pool-management logic includes allocating a contract that includes the pool-management logic; and allocating the entity-management logic includes allocating a second contract that includes the entity-management logic.

8. The method of claim 1, wherein:

allocating the pool-management logic and allocating the entity-management logic includes allocating a contract that includes both the pool-management logic and the entity-management logic.

9. The method of claim 1, wherein:

allocating the entity-management logic includes allocating a plurality of instances of the entity-management logic, each instance of the entity-management logic being associated with a different one of the pool of real-life entities.

10. The method of claim 1, wherein:

the pool-specific prize is replenished periodically.

11. The method of claim 1, wherein:

each entity in the pool of real-life entities is a professional athlete and the rank of the real-life entity is based on an athletic performance of the real-life entity.

12. An apparatus for provisioning a market-based game on a blockchain platform comprising at least one processor and a memory operatively coupled to the at least one processor and being configured to store processor-executable instructions, which when executed by the at least one processor cause the at least one processor to perform a method comprising the steps of:

allocating, on the blockchain platform, pool-management logic including one or more processor-executable instructions, which when executed cause the apparatus to:

allocate, on the blockchain platform, a plurality of non-fungible tokens, each non-fungible token representing a different real-life entity in a pool of real-life entities;

for each of the plurality of non-fungible tokens, allocate, on the blockchain platform, one or more corresponding fungible tokens that represent shares in the non-fungible token; and calculate a first entity-specific prize corresponding to a first real-life entity in the pool of real-life entities based on a rank of the first real-life entity in the pool of real-life entities, and a pool-specific prize associated with the pool of real-life entities, the first real-life entity being represented by a first one of the plurality of non-fungible tokens.

13. The apparatus of claim 12, further comprising:

allocating, on the blockchain platform, entity-management logic including one or more processor-executable instructions that cause the blockchain platform to calculate a user-specific prize based on the entity specific prize and a number of shares in one of the plurality of non-fungible tokens that is stored in a user wallet.

14. The apparatus of claim 12, further comprising:

allocating, on the blockchain platform, entity-management logic including one or more processor-executable instructions that cause the blockchain platform to execute a transaction on the blockchain platform providing the user-specific prize to an owner of the user wallet.

15. The apparatus of claim 12, further comprising:
allocating, on the blockchain platform, entity-management logic including one or more processor-executable instructions that cause the blockchain platform to replenish the pool-specific prize by transferring electronic funds to a pool wallet that is associated with the pool of real-life entities for further distribution by the pool-management logic and the entity-management logic.

16. The apparatus of claim 12, wherein:
providing the first user-specific prize to the owner of the user wallet includes transferring the user-specific prize to the user wallet.

17. The apparatus of claim 12, further comprising:
transmitting to the pool-management logic an indication of the rank of the real-life entity.

18. The apparatus of claim 12, wherein:
each entity in the pool of real-life entities is a professional athlete and the rank of the real-life entity is based on an athletic performance of the real-life entity.

19. The apparatus of claim 12, wherein:
allocating the entity-management logic includes allocating a plurality of instances of the entity-management logic, wherein each instance of the entity-management logic is associated with a different one of the pool of real-life entities.

20. The apparatus of claim 12, wherein:
the pool-specific prize is replenished periodically.

* * * * *